(12) United States Patent
Maino et al.

(10) Patent No.: US 8,510,837 B2
(45) Date of Patent: Aug. 13, 2013

(54) DETECTING ROOTKITS OVER A STORAGE AREA NETWORK

(75) Inventors: Fabio R. Maino, Palo Alto, CA (US); Dinesh G. Dutt, Sunnyvale, CA (US); Samar Sharma, San Jose, CA (US); Arindam Paul, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1357 days.

(21) Appl. No.: 11/967,731

(22) Filed: Dec. 31, 2007

(65) Prior Publication Data
US 2009/0172816 A1 Jul. 2, 2009

(51) Int. Cl.
*H04L 29/06* (2006.01)

(52) U.S. Cl.
USPC .......... 726/24; 726/22; 726/23; 726/25; 713/188; 707/827; 709/217; 709/218; 709/219

(58) Field of Classification Search
USPC ................. 726/24; 713/188; 707/827
See application file for complete search history.

(56) References Cited

U.S. PATENT DOCUMENTS

| 7,150,042 | B2 | 12/2006 | Wolff et al. | |
|---|---|---|---|---|
| 7,802,300 | B1 * | 9/2010 | Liu et al. | 726/23 |
| 2004/0172551 | A1 * | 9/2004 | Fielding et al. | 713/200 |
| 2005/0125418 | A1 * | 6/2005 | Brewer et al. | 707/10 |
| 2006/0004737 | A1 | 1/2006 | Grzonka | |
| 2006/0248303 | A1 * | 11/2006 | Kano | 711/163 |
| 2007/0055711 | A1 * | 3/2007 | Polyakov et al. | 707/203 |
| 2007/0094539 | A1 | 4/2007 | Nakatsuka et al. | |
| 2007/0118903 | A1 * | 5/2007 | Bates et al. | 726/22 |
| 2007/0260643 | A1 | 11/2007 | Borden et al. | |
| 2008/0301426 | A1 * | 12/2008 | Arges et al. | 713/2 |
| 2012/0054868 | A1 * | 3/2012 | Ramalingam | 726/24 |

OTHER PUBLICATIONS

Heasman, "Implementing and Detecting a PCI Rootkit", Nov. 15, 2006, pp. 1-15.*
International Search Report and Written Opinion dated Jul. 2, 2009.

* cited by examiner

*Primary Examiner* — Taghi Arani
*Assistant Examiner* — Thaddeus Plecha
(74) *Attorney, Agent, or Firm* — Patterson & Sheridan LLP

(57) ABSTRACT

Embodiments of the invention improve the detection of malicious software applications, such as a rootkit, on hosts configured to access storage volumes over a storage area network (SAN). A rootkit detection program running on a switch may be configured to detect rootkits present on the storage volumes of the SAN. Because the switch may mount and access storage volumes independently from the (possibly comprised) hosts, the rootkit is not able to conceal itself from the rootkit detection program running on the switch.

15 Claims, 4 Drawing Sheets

DETECTING ROOTKITS OVER A STORAGE AREA NETWORK

BACKGROUND OF THE INVENTION

1. Field of the Invention

Embodiments of the present invention generally relate to techniques for detecting malicious software applications, such as a rootkit, and more specifically, to detecting such malicious software applications over a storage area network.

2. Description of the Related Art

As is known, the term rootkit generally refers to a set of software programs intended to conceal running processes, files or system data, allowing a system to remain compromised. Rootkits often modify parts of an operating system or install themselves as drivers or kernel modules (i.e., a dynamically loaded portion of an operating system kernel).

Methods for rootkit detection have been developed that integrate rootkit detection into traditional antivirus products. Such products may be configured to scan for the presence of a rootkit in the memory of a compromised host. However, the rootkit may be configured to recognize that a scan may be about to occur, and respond by removing itself from memory and storing itself on disk in order to hide its presence during the scan process. A "stealth" detector may be configured to find and identify a rootkit that has stored itself in this manner. Similarly, traditional antivirus products may identify the rootkit using "fingerprint" detection for rootkit files stored disk. This combined defense may force attackers to implement counter-attack mechanisms in their rootkit code that forcibly remove security software processes from memory, effectively killing the antivirus program. As with computer security threats, the detection and elimination of rootkits remains an ongoing struggle between the creators of the tools on both sides of the conflict.

A well-constructed rootkit may be very difficult to detect. Specifically, an infected operating system can no longer be trusted to accurately report on the state of memory, processes or files. For example, actions such as requesting a list of all running processes or a list of all files in a directory cannot be trusted to behave as intended by the original designers. Thus, rootkit detectors which run on live systems may work only because a given rootkit may not fully conceal its presence.

Accordingly, what is needed is a technique for detecting rootkits that do not rely on the responses provided by a compromised operating system.

SUMMARY OF THE INVENTION

Embodiments of the invention may be used to improve rootkit detection in a networked computing environment. One embodiment of the invention includes a routing device configured to connect a host system to one or more storage volumes present on a storage device. The routing device may generally include a processor, a networking interface, and a memory that includes a rootkit detection program. The rootkit detection program may be configured to mount one of the storage volumes present on the storage device and to evaluate one or more files on the mounted storage volume to detect the presence of a rootkit.

In a particular embodiment, the rootkit detection program may be configured to evaluate the one or more files on the mounted storage volume by evaluating the one or more files against a manifest of files that should be present on the host system. The manifest of files may specify, for example, one or more file names, file sizes, checksums, or file time/date stamps of files that should be present on the host system.

In another embodiment, the rootkit detection program may be configured to evaluate the one or more files on the mounted storage volume to identify the presence of a rootkit by generating a file signature for each of the one or more files and comparing each generated file signature with a list of known rootkit file signatures. For example, the rootkit detection program may be configured to generate a hash value for each of the one or more files. In such a case, the generated hash values may be compared against a list of known rootkit file signatures includes a list of hash values associated with known rootkit files.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
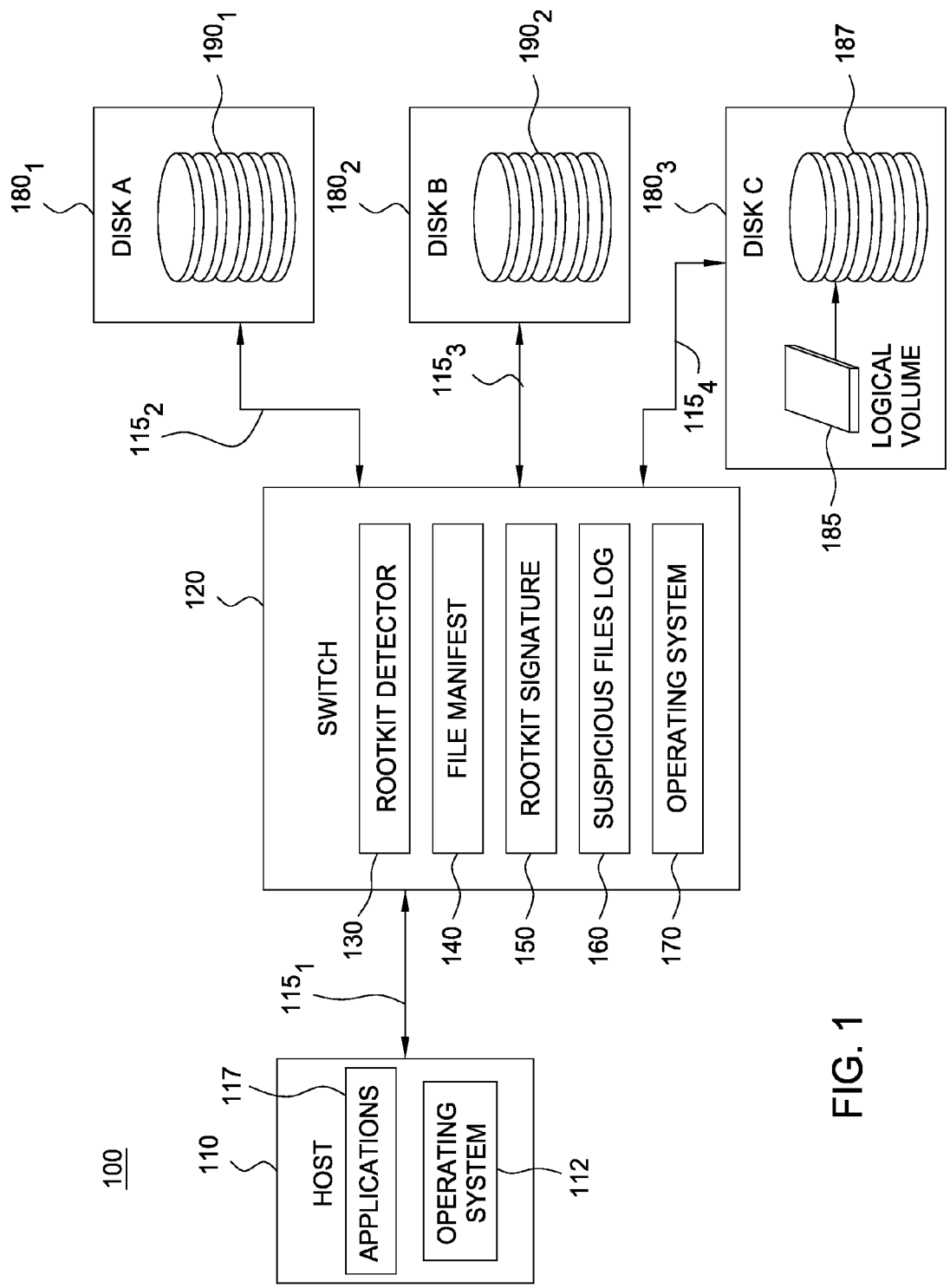
FIG. 1 is a block diagram illustrating a computing environment that includes a storage area network (SAN) accessed over a network switch, according to one embodiment of the invention.

As stated, the term "rootkit" generally refers to a set of programs configured to subvert control of an operating system. Usually, a rootkit modifies a running system to obscure its installation and presence. That is, rootkits often modify operating system components that would otherwise reveal the presence of the rootkit. For example, rootkits are frequently configured to conceal running processes, files, or system data, or to modify operating system components or programs used to report on these elements of a running system (e.g., a tool used to list of the files in a directory). Thus, when a user (or program) requests a directory listing, the program, as modified by the rootkit, may alter the results such that the directories or files of the rootkit are not reported. This makes detecting the presence of a rootkit (or other malicious software program) particularly difficult, as the responses of operating system utilities cannot be trusted. Like a rootkit, other malicious programs (e.g., viruses, spyware, botnet applications, etc.) may be configured to modify elements of a running system to hide their presence.

A storage area network (SAN) refers to a network architecture used to attach remote computer storage devices (e.g., one or more disk drives) to servers and hosts in such a way that storage volumes or partitions accessed over the SAN appear to a host system as though they are locally attached to the host system. The SAN may include an array of physical disk or provide volumes on a virtualized storage device. The host may communicate with the SAN using a variety of communication links. For example, fibre channel is a gigabit speed networking technology primarily used for Storage Area Networking (SAN). A switch (or other networking device) may connect a host system to the storage volumes present on a disk array using fibre optic connections. Because the storage volume on the SAN appears to the host system as locally attached storage, a rootkit may compromise the host system by modifying files accessed by the host system over the SAN. In such a case, elements of a rootkit may be present in the memory of the host, as well as in files, on a storage volume accessed over the SAN.

Embodiments of the invention may be used to improve rootkit detection in a networked computing environment. In particular, embodiments of the invention improve rootkit detection on hosts configured to access storage volumes over a SAN. In one embodiment, a rootkit detection program running on a switch may be configured to detect rootkits present on the storage volumes of the SAN. Because the switch may mount and access storage volumes independently from the (possibly compromised) hosts, the rootkit is not able to conceal itself from the rootkit detection program running on the switch. In one embodiment, the switch may store a manifest of files that should be present on the host, such as a list of files that should be present in an operating system directory. Such a list may include file names as well as file attributes, such as a last modified time/date stamp and a size. In such a case, the rootkit detection program may evaluate the operating system files associated with a given host to ensure they match the files present on the manifest. For example, a compromised operating system may have missing or extra files present in system directories, may have files with modified timestamps, checksums or sizes. Similarly, the rootkit detection program may be configured to scan for other types of malicious programs that actively modify system components or perform other actions to hide their presence on a comprised system.

In another embodiment, the switch may store a set of known rootkit signatures, e.g., a set of file hashes, and the rootkit detector may generate a hash value for each file on a given storage volume to compare with the known signatures. If a rootkit with a known signature is present on a storage volume of the SAN, the rootkit detector recognizes the presence of the file by matching a hash of the file with the known signature.

When the rootkit detection program identifies a suspicious file (using either a file manifest or a rootkit signature), the detection program may notify a system administrator or other appropriate user. Further, in one embodiment, the rootkit detection program may in some cases be able to restore a compromised system. For example, the switch may delete files associated with a rootkit or replace modified files with unaltered ones.

An Exemplary Network Environment

FIG. 1 is a block diagram illustrating a computing environment 100 that includes a storage area network (SAN) accessed over a network switch, according to one embodiment of the invention. As shown, computing environment 100 includes a host 110, a switch 120, and a series of storage drives $180_{1-3}$ associated with the host 110. The host 110 illustrated in environment 100 is included to be representative of existing computer systems, e.g., desktop computers, server computers, laptop computers, tablet computers, and the like. However, embodiments of the invention are not limited to any particular computing system, application, or network architecture, and may be adapted to take advantage of new computing systems as they become available. Additionally, those skilled in the art will recognize that the host illustrated in FIG. 1 is simplified to highlight aspects of the present invention and that computing systems and networks typically include a variety of additional elements not shown in FIG. 1.

In this example, host 110 may be configured to mount storage volumes $190_{1-2}$ present on drives $180_{1-3}$. Further, the SAN may be configured such that the drives 180 appear to host 110 as local storage. That is, the storage volumes 190 appear to applications 117 and operating system 112 running on host 130 as though they were physically present on host 110. Thus, generally, switch 120 is configured to manage read and write requests used to access files present on storage volumes 190.

Figure 2:
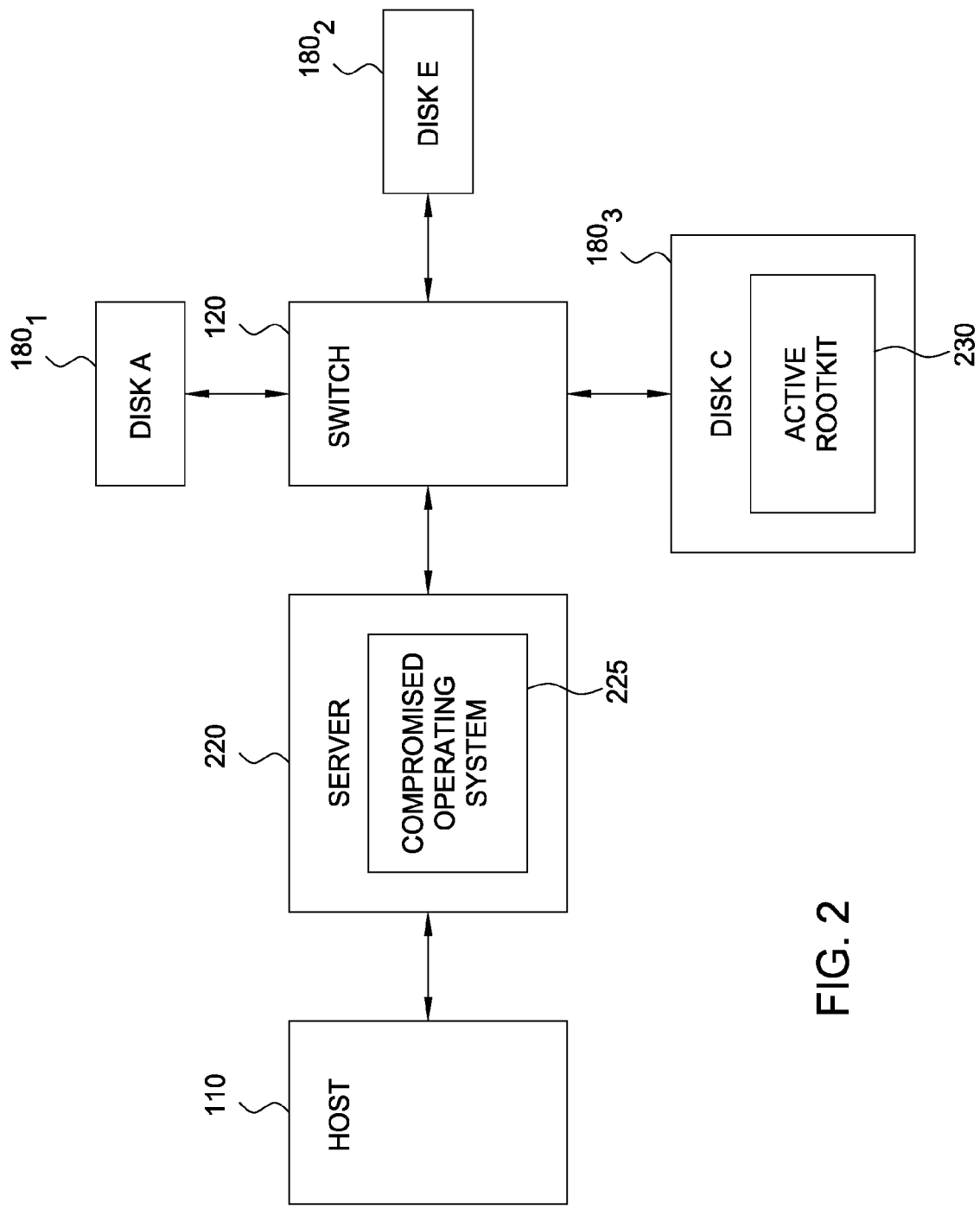
FIG. 2 is a block diagram illustrating a computing environment that includes server system compromised by a rootkit, according to one embodiment of the invention.

Illustratively, the SAN shown in FIG. 2 includes two physical disk arrays $180_{1-2}$ as well as a virtualized disk array $180_3$. The virtualized disk array $180_3$ provides one or more logical volumes 185 managed by virtualization software running on the switch 120 or on the virtualized disk array directly. Storage virtualization refers to a logical storage device used to abstract a physical storage device. Virtualization software (e.g., LVM) abstracts the underlying physical storage 187 and offers a view of that storage to the host as logical volume 185. Storage virtualization allows multiple physical disks and/or logical storage units from disparate systems to be aggregated into a common storage pool. Logical volumes (e.g., virtualized disk array $180_3$) may be defined using the space provided by the common storage pool and exposed to host systems (e.g., host 110). For example, the physical storage 187 for logical volume 185 might be mirrored across multiple physical storage arrays. To the host 110 however, the logical volume 185 appears as though it were just one single volume. The virtualization software is configured to interpret each read/write request made to the logical volume 185, replicate write requests across multiple volumes, and maintain mirror consistency at all times As shown, the switch 120 includes a rootkit detector 130, a file manifest 140, rootkit signatures 150, a suspicious files log 160, and a switch operating system 170. The switch operating system 170 generally controls the operations of the switch 120 in processing read/write requests and manages a connection $115_1$ between the host 110 and the switch 120 as well as connections $115_{2-4}$ between the switch 120 and disks $180_{1-3}$.

As shown, switch 130 includes rootkit detector 130. The rootkit detector 130 may be configured to mount the storage volumes $190_{1-3}$ on disks $180_{1-3}$ and evaluate files stored thereon to identify the presence of a rootkit. In one embodiment, the rootkit detector 130 may be configured to mount one of the storage volumes 190 directly. That is, the rootkit detector 139 may mount the storage volume 190 independently of the operating system 112 of host 110. For example, the rootkit detector 130 may mount the same storage volumes presented to host 130 and compare certain files against the file manifest 140. Alternatively (or additionally), rootkit detector 130 may generate a "fingerprint" (e.g., a hash value) for certain files on storage volumes 190 to compare against fingerprints of known rootkit files. The rootkit detector 130 may be scheduled to run periodically, or may be invoked by a user.

The file manifest 140 may provide a list of certain files that should be present as part of the host operating system 112, or attributes of certain files that should be on the host operating system 112. For example, the file manifest 140 may include a list of file names as well as file attributes, such as a last modified time/date stamp and file sizes. The file manifest 140 may be created using a clean installation of the operating system found on the host. Typically, the rootkit detector 130 does not evaluate temporary files or user-created data files (e.g., word processing documents) against the file manifest 140, since application programs, and users continually create and delete files as part of ongoing system operations.

However, the rootkit detector 130 may be configured evaluate these (and other) types of files by generating a fingerprint value from the content of a given file and comparing that value against a set of known rootkit fingerprints. Accordingly, the network switch 120 may also include a database of known rootkit signatures 150. In one embodiment, the rootkit detector 130 may be configured to evaluate each file on a given storage volume 190 to identify whether any file has a fingerprint matching one of the rootkit signatures 150. Additionally, whether identified using the file manifest 140 or the rootkit signatures 150, the suspicious files log 160 may be used to store an indication of the presence of a rootkit on one of the storage volumes 190. Further, the rootkit detector 130 may in some cases be configured to purge the rootkit from a given storage volume, as well as to send a notification to an appropriate system administer that the presence of a rootkit has been identified.

FIG. 2 is a block diagram illustrating a computing environment that includes server system 220 compromised by a rootkit, according to one embodiment of the invention. In this example, one or more files associated with an active rootkit 230 are present on a storage volume of SAN disk 180$_3$. At the same time, the rootkit 230 is active in the memory of compromised operating system 225. Accordingly, rootkit 230 may take active steps to conceal its presence. For example, if an administrator uses a system utility present on server 220 to list files on a storage volume on disk 180$_3$, the compromised operating system 225 may modify the results to conceal the presence of the active rootkit 230. However, in one embodiment, a rootkit detector running on the switch 120 may mount storage volumes on the disk 180$_3$ directly. Thus, when the switch 120 performs a directory listing of files on the disk 180$_3$, the active rootkit 220 is unable to conceal its presence from the rootkit detector running on the switch 120. In other words, by mounting the storage volumes on disk 180$_3$ directly, the rootkit detector may simply bypass the compromised operating system 225 located on the server 220.

Figure 3:
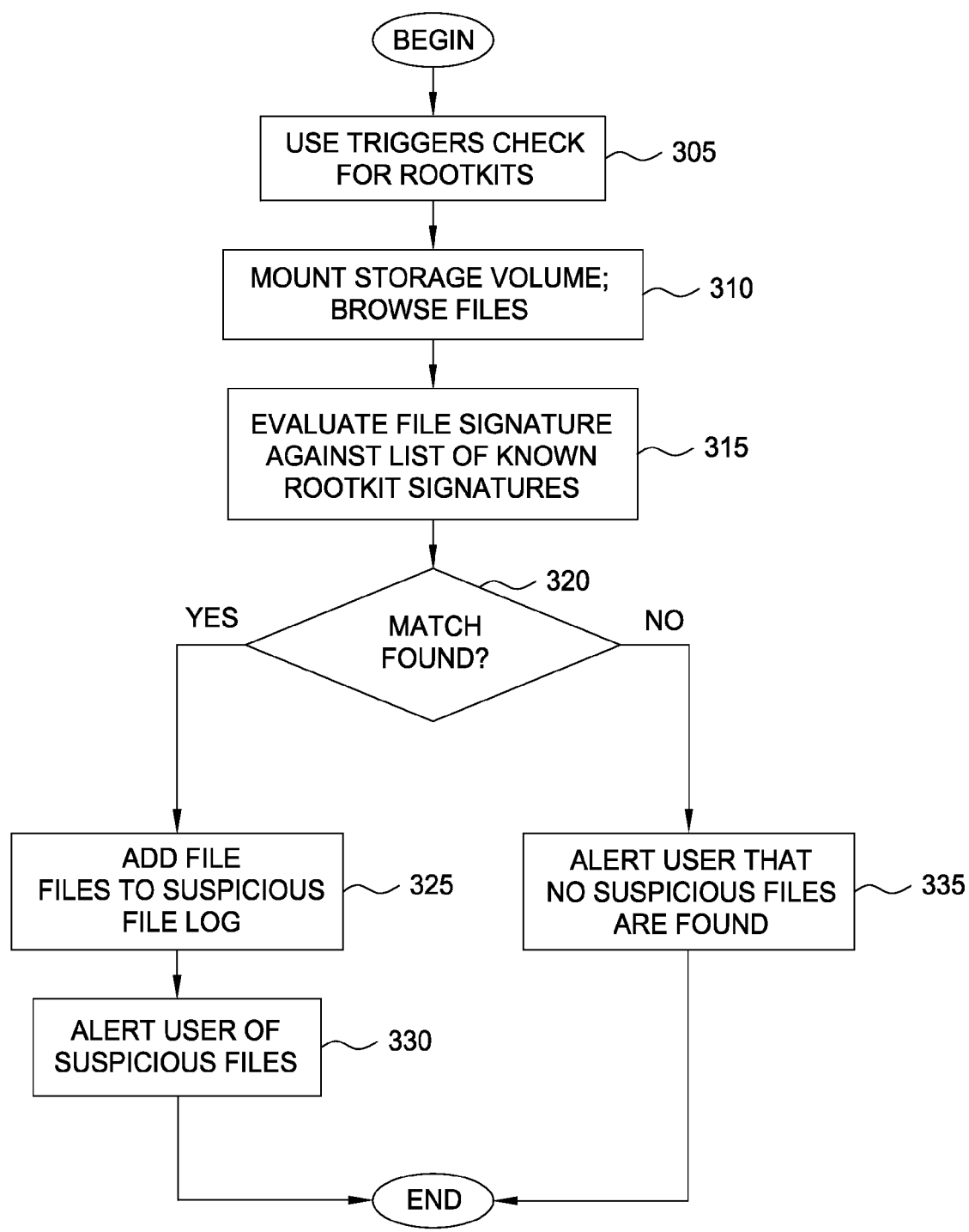
FIG. 3 is a flow diagram illustrating a method for detecting rootkits in a storage area network, according to one embodiment of the invention.

FIG. 3 is a flow diagram of a method 300 for detecting rootkits in a computing environment, according to one embodiment of the invention. More specifically, FIG. 3 illustrates a method for detecting rootkits using a list of rootkit signatures. As shown, the method 300 begins at step 305 where a user triggers a check for rootkits. Alternatively, the rootkit detector may be configured to automatically evaluate a storage volume at periodic intervals. In response, at step 310, a rootkit detector located on the switch may mount a storage volume present on a disk of a storage area network (SAN). In one embodiment, the particular storage volume may be specified when the user triggers the check. As described above, the rootkit detector may be configured to evaluate files on the storage volume against a list of known rootkit signatures. Accordingly, at step 315, the rootkit detector may generate a file signature for a given file on the storage volume and compare the file signature against the list of known rootkit signatures located on the switch. For example, the rootkit signatures may provide an MD5 (or other) hash value associated with a given rootkit file. In such a case, the rootkit detector may generate an MD5 hash value for a file on the storage volume and compare it against the known hash values in the rootkit signature list.

If a match is found, at step 325, the rootkit detector may add an entry to a list of suspicious files. Such a list may provide, for example, the name of a potentially compromised file, along with an indication of what rootkit was found. Further, the rootkit detector may be configured to provide an indication of what may need to be done to purge the rootkit from the storage volume on the SAN or what other files are expected to be present or compromised. At step 330, the root kit detector may alert the appropriate user (e.g., a system administrator) to the presence of any suspicious files found during a scan of the storage volume. Otherwise, if no matches are found, then at step 335, the rootkit detector may notify the user that a scan was completed and that the storage volume does not appear to be compromised by any known rootkits (as represented by the rootkit signatures).

Figure 4:
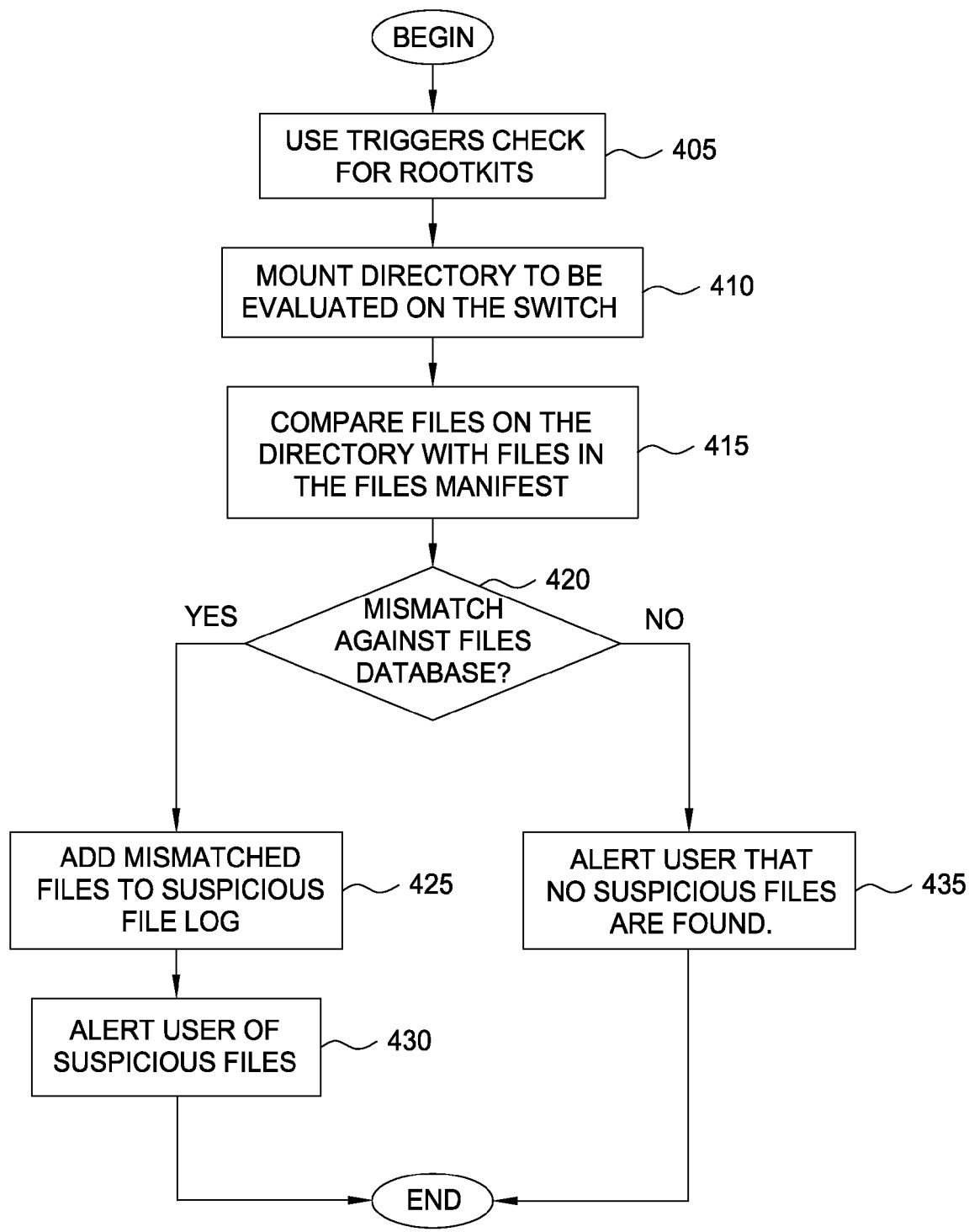
FIG. 4 is a flow diagram illustrating another method for detecting rootkits in a storage area network, according to one embodiment of the invention.

FIG. 4 is a flow diagram illustrating a method 400 for detecting rootkits in a storage area network (SAN), according to one embodiment of the invention. More specifically, method 400 illustrates a process for detecting rootkits using a file manifest which lists certain files (or attributes of certain files) that should (or should not) be present on a storage volume of the SAN. As shown, the method 400 begins at step 405 where a user triggers a check for rootkits using a rootkit detector present on the network switch of the SAN. Alternatively, the rootkit detector may be configured to automatically evaluate a storage volume on the SAN at periodic intervals.

At step 410, the rootkit detector mounts the storage volume to be evaluated. At step 415, the rootkit detector may compare files on the mounted storage volume with information from the file manifest. For example, the rootkit detector may look for the presence (or absence) of certain files or directories on the storage volume, or evaluate file names or file attributes, e.g., a last modified time/date stamp or file size values. If a suspicious file is found (e.g., one that should not be in a given directory or one that should be present, but with a different size) an entry may be added to a suspicious files log. As stated, such a list may provide the name of a potentially compromised file, along with an indication of what aspect of the file is suspicious based on a comparison against the file manifest. At step 430, the rootkit detector may alert the appropriate user to the presence of any suspicious files found during a scan of the storage volume. Otherwise, if no mismatch between the files on the storage volume and the file manifest is found, then at step 435, the rootkit detector may notify the user that a scan was completed and that the storage volume does not appear to be compromised by any known rootkits (as represented by the comparison of files on the storage volume against the manifest).

Advantageously, embodiments of the invention may be used to improve rootkit detection in a networked computing environment. In particular, embodiments of the invention improve rootkit detection on hosts configured to access storage volumes over a SAN. In one embodiment, a rootkit detection program running on a switch may be configured to detect rootkits present on the storage volumes of the SAN. Because the switch may mount and access storage volumes independently from the (possibly compromised) hosts, the rootkit is not able to conceal itself from the rootkit detection program running on the switch.

While the foregoing is directed to embodiments of the present invention, other and further embodiments of the invention may be devised without departing from the basic scope thereof, and the scope thereof is determined by the claims that follow.

The invention claimed is:

1. A storage area network (SAN) routing device configured to provide one or more host systems with access to one or more storage volumes present on a storage device, comprising:

a processor;

a storage networking interface configured to manage read and write requests made by the host systems to access the one or more storage volumes, and wherein the SAN routing device provides the one or more host systems with access to the storage volumes such that a mounted storage volume appears to a host system as a storage device physically present on the host system; and a memory that includes a program, wherein the program is configured to:
- mount, by the routing device, one of the storage volumes present on the storage device,
- retrieve a manifest specifying a list of files, wherein the list of files specifies a list of known rootkit signatures,
- generate a file signature for each of one or more files on the mounted storage volume host system, and
- compare each generated file signature with the list of known rootkit signatures to detect the presence of a rootkit active in a memory of one of the host systems.

2. The routing device of claim 1, wherein the list of files specifies one or more file names, sizes, checksums, or time/date stamps of files that should be present on one of the host systems.

3. The routing device of claim 2, wherein generating a file signature for each of the one or more files comprises generating a hash value for each of the one or more files, and wherein the list of known rootkit signatures includes a list of hash values associated with known rootkits.

4. The routing device of claim 1, wherein the program is configured to automatically run at specified periodic intervals.

5. The routing device of claim 1, wherein the program is further configured to run in response to being invoked by a user.

6. The routing device of claim 1, wherein the program is further configured to notify a user that presence of a rootkit has been detected on the storage volume.

7. The routing device of claim 1, wherein at least one of the storage volumes mounted by the routing device is a virtualized storage volume defined for one or more underlying physical storage devices.

8. A method, comprising:
- periodically mounting, from a storage area network (SAN) routing device configured to connect a host system to one or more storage volumes present on a storage device, wherein the SAN routing device is configured to manage read and write requests made by the host systems to access the one or more storage volumes and wherein the SAN routing device provides the host system with access to the storage volumes such that a mounted storage volume appears to the host system as a storage device physically present on the host system;
- identifying one or more files present on the mounted storage volume;
- retrieving a manifest specifying a list of files, wherein the list of files specifies a list of known rootkit signatures;
- generating a file signature for each of one or more files on the mounted storage volume host system;
- comparing each generated file signature with the list of known rootkit signatures to detect the presence of a rootkit active in a memory of one of the host systems; and
- upon detecting a presence of a rootkit in one of the identified files, adding an entry reflecting the presence of the rootkit active in the memory of the host system to a file log.

9. The method of claim 8, wherein the list of files specifies one or more file names, sizes, checksums, or time/date stamps of files that should be present on the host system.

10. The method of claim 8, wherein generating a file signature for each of the one or more files comprises generating a hash value for each of the one or more files, and wherein the list of known rootkit signatures includes a list of hash values associated with known rootkits.

11. The method of claim 8, wherein at least one of the periodically mounted storage volumes is a virtualized storage volume defined for one or more underlying physical storage devices.

12. An apparatus, comprising
- a means for connecting one or more host systems to one or more storage volumes present on a storage device such that a mounted storage volume appears to a host system as a storage device physically present on the host system;
- a means to manage read and write requests made by the host systems to access the one or more storage volumes;
- a means for mounting, from the apparatus, one of the storage volumes present on the storage device;
- a file manifest identifying one or more files, wherein the list of files specifies a list of known rootkit signatures;
- a means for:
  - mounting one of the storage volumes present on the storage device,
  - retrieving the file manifest specifying the list of known rootkit signatures,
  - generating a file signature for each of one or more files on the mounted storage volume host system, and
  - comparing each generated file signature with the list of known rootkit signatures to detect the presence of a rootkit active in a memory of one of the host systems.

13. The apparatus of claim 12, wherein the list of files specifies one or more file names, sizes, checksums, or time/date stamps of files that should be present on the host system.

14. The apparatus of claim 12, wherein generating a file signature for each of the one or more files comprises generating a hash value for each of the one or more files, and wherein the list of known rootkit signatures includes a list of hash values associated with known rootkit.

15. The apparatus of claim 12, wherein at least one of the storage volumes mounted by the routing device is a virtualized storage volume defined for one or more underlying physical storage devices.

* * * * *